(12) United States Patent  (10) Patent No.: US 8,275,705 B2
Katz et al.  (45) Date of Patent: *Sep. 25, 2012

(54) SYSTEM AND METHOD FOR PROVIDING DISPUTE RESOLUTION FOR ELECTRONIC PAYMENT TRANSACTIONS

(75) Inventors: Matthew Katz, Beverly Hills, CA (US); Cory Capoccia, Santa Monica, CA (US)

(73) Assignee: Verifi, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/104,907

(22) Filed: May 10, 2011

(65) Prior Publication Data

US 2011/0213702 A1  Sep. 1, 2011

Related U.S. Application Data

(63) Continuation of application No. 12/343,195, filed on Dec. 23, 2008, now Pat. No. 7,941,352.

(51) Int. Cl.
*G06Q 40/00* (2012.01)

(52) U.S. Cl. .......... 705/39; 705/30; 705/40; 705/44; 705/80; 235/379; 707/6

(58) Field of Classification Search .......... 705/39, 705/30, 40, 44; 235/379
See application file for complete search history.

(56) References Cited

U.S. PATENT DOCUMENTS

| 6,032,132 A | 2/2000 | Nelson |
| 2001/0044756 A1 | 11/2001 | Watkins et al. |
| 2002/0198830 A1 | 12/2002 | Randell et al. |
| 2006/0149671 A1 | 7/2006 | Nix et al. |
| 2006/0259427 A1 | 11/2006 | Randell et al. |
| 2008/0228638 A1 | 9/2008 | Scipioni et al. |

*Primary Examiner* — Vanel Frenel
(74) *Attorney, Agent, or Firm* — Connolly Hove Lodge & Hutz LLP

(57) ABSTRACT

A computer-based system and method for resolving disputes between a customer and an electronic payment provider concerning an electronic transaction between the customer and a merchant, including receiving data related to the transaction in a computer; transmitting the data from the computer to a dispute resolution server; comparing the transaction data to predetermined eligibility criteria for dispute resolution in the dispute resolution server, and if the dispute resolution criteria is met, declining future transactions from the merchant for the disputing consumer; and, comparing the transaction data to predetermined eligibility criteria for transaction credit, and if the credit criteria is met, and transmitting a credit instruction for the transaction.

18 Claims, 3 Drawing Sheets

SYSTEM AND METHOD FOR PROVIDING DISPUTE RESOLUTION FOR ELECTRONIC PAYMENT TRANSACTIONS

CROSS-REFERENCE TO RELATED APPLICATIONS

This application is a continuation of U.S. patent application Ser. No. 12/343,195 filed Dec. 23, 2008, now U.S. Pat. No. 7,941,352, which is hereby expressly incorporated by reference herein.

TECHNICAL FIELD

This invention generally relates to a method and system for providing dispute resolution for credit card or other electronic payment transactions, including but not limited to, debit card, ACH, eCheck, LEC transactions, etc. More specifically, the invention provides a method and system for allowing card issuers or other electronic payment provider to automatically remove cardholders or other purchasers from recurring payment programs and to issue credits to cardholders for disputed credit card transactions, if appropriate transaction parameters are satisfied, and to decline such credit requests when the transaction parameters are not satisfied.

BACKGROUND OF THE INVENTION

Credit cards and other payment instruments, such as debit cards and check cards, are widely used by holders to purchase goods and services in the marketplace. It is projected that at least 35% of all U.S. cardholder payments in 2007 will be made via "plastic" (i.e., a credit or debit card), and it is estimated that this rate will increase to at least 49% by 2010. The current annual value of these transactions exceeds 400 billion dollars. While credit card transactions are convenient for cardholders, they present a special set of problems for merchants and credit card issuers. One such problem occurs when a cardholder disputes a credit card transaction, necessitating the expenditure of substantial time and resources in investigating and resolving such disputes.

Cardholders and other purchasers using an electronic payment provider are increasingly going directly to their card issuer to resolve billing disputes rather than contacting the merchant directly. This trend toward chargebacks that are initiated with out any prior contact with the merchant by the cardholder results in inefficient resolution of such disputes because when the merchant is not directly involved in the resolution process, the card issuer must undertake the resolution activities on behalf of the merchant, thus increasing the complexity, time and expense of the resolution process.

To understand the problem presented by credit card and other electronic payment provider transaction disputes, a brief overview of the electronic payment provider process is required. Credit cards are provided to a cardholder by an issuing bank. When a cardholder enters into a transaction with a merchant using the credit card, the issuing bank commits to pay the merchant at the time the transaction is verified.

Each month, the credit card user is sent a statement documenting the purchases made with the card, and the total balance owed. According to the Fair Credit Billing Act, the cardholder can dispute any charges on the statement that he or she thinks are incorrect. The cardholder mayor may not have contacted the merchant about remedying the situation before contacting the issuing bank.

The chargeback process varies somewhat from credit card company to credit card company, but generally follows the sequence shown in FIG. 1. At step 1, a credit card holder disputes a transaction with their issuing bank. At step 2, the issuing bank investigates to determine whether the chargeback request is valid, and if it is not, denies the chargeback. At step 3, a provisional credit representing the amount charged is placed back in the user's account. At step 4, the issuing bank initiates a chargeback process and obtains credit representing the chargeback purchase from the merchant's bank. At step 5, the merchant's bank investigates the chargeback request to determine if it is valid, and, if not, the chargeback is returned to the issuing bank. If the merchant's bank determines the chargeback is valid, at step 6, the chargeback amount is removed from the merchant's bank account, and the merchant's bank provides written notice to the merchant. At step 7, the merchant is given an opportunity to refute the chargeback, and, if its documentation is satisfactory, the chargeback is declined and the cardholder is once again charged for the sale. If the chargeback is not declined, the chargeback is successful and the process is completed.

SUMMARY

The present invention provides a card issuer or other electronic payment provider with a system and method for obtaining a quick, favorable and efficient resolution to the customers' disputes with merchants, thus reducing operating expenses, while providing superior customer service. The present invention may also be used simultaneously with one or more of various types of electronic payments offered by card issuers or other electronic payment providers, such as credit card, debit card, ACH, eCheck, mobile payments, LEC, etc., transactions, and with one or more payment brands or networks within each type of electronic payment transactions, such as within credit card electronic payment transactions, providing simultaneous use with Visa, MC, Amex, Discover and JCB card transactions. The present invention thus provides multiple connectivity to a plurality of various types of electronic payment networks, such as credit card, debit card, ACH, eCheck, mobile payments, LEC, etc., and with one or more payment brands or networks within each type of electronic payment transactions.

The present invention allows issuers to obtain a quick turnaround in cardholder credit processing with minimal resource expenditure. For recurring payment program merchants, cardholders are removed from the recurring payment program, which prevents submission of future authorization requests, thus eliminating the potential for future disputes. The present invention thereby significantly reduces the time and cost required for the card issuer to resolve cardholder transaction disputes, while delivering a favorable resolution to the cardholder.

In one preferred embodiment, shown in FIGS. 2 and 3, the system and method of the present invention are illustrated. The payment instrument holder initiates a notice of dispute to the card issuer and submits the necessary transaction information by internet, mail, fax, email, in-person, via SMS mobile text, mobile phone or by telephone, through the touch-tone keypad of the phone, or by responding orally wherein the system utilizes voice recognition software (IVR) to convert voice data into computer readable data.

The card issuer or device associated with the card issuer terminal, such as a scanner or IVR system, inputs the transaction information into the card issuer terminal for processing by the card issuer processing system.

The card issuer processing system sends a queue of eligible transactions to the dispute resolution system server for processing. This request includes the transaction data that is required for adjudication of the dispute regarding the transaction, such as credit card number, transaction amount, transaction date and merchant identification. The dispute resolution system determines if the transaction qualifies for resolution under the system and, if so, directs the issuance of the credit to the cardholder for the transaction, cancels the transaction, and sends reports of the results of the dispute resolution to the card issuer and the originating merchant. The present invention may be used with multiple card types, card issuers, merchants and payment types, such as ACH, mobile payments, LEC billing, etc.

DETAILED DESCRIPTION OF THE PREFERRED EMBODIMENTS

Figure 1:
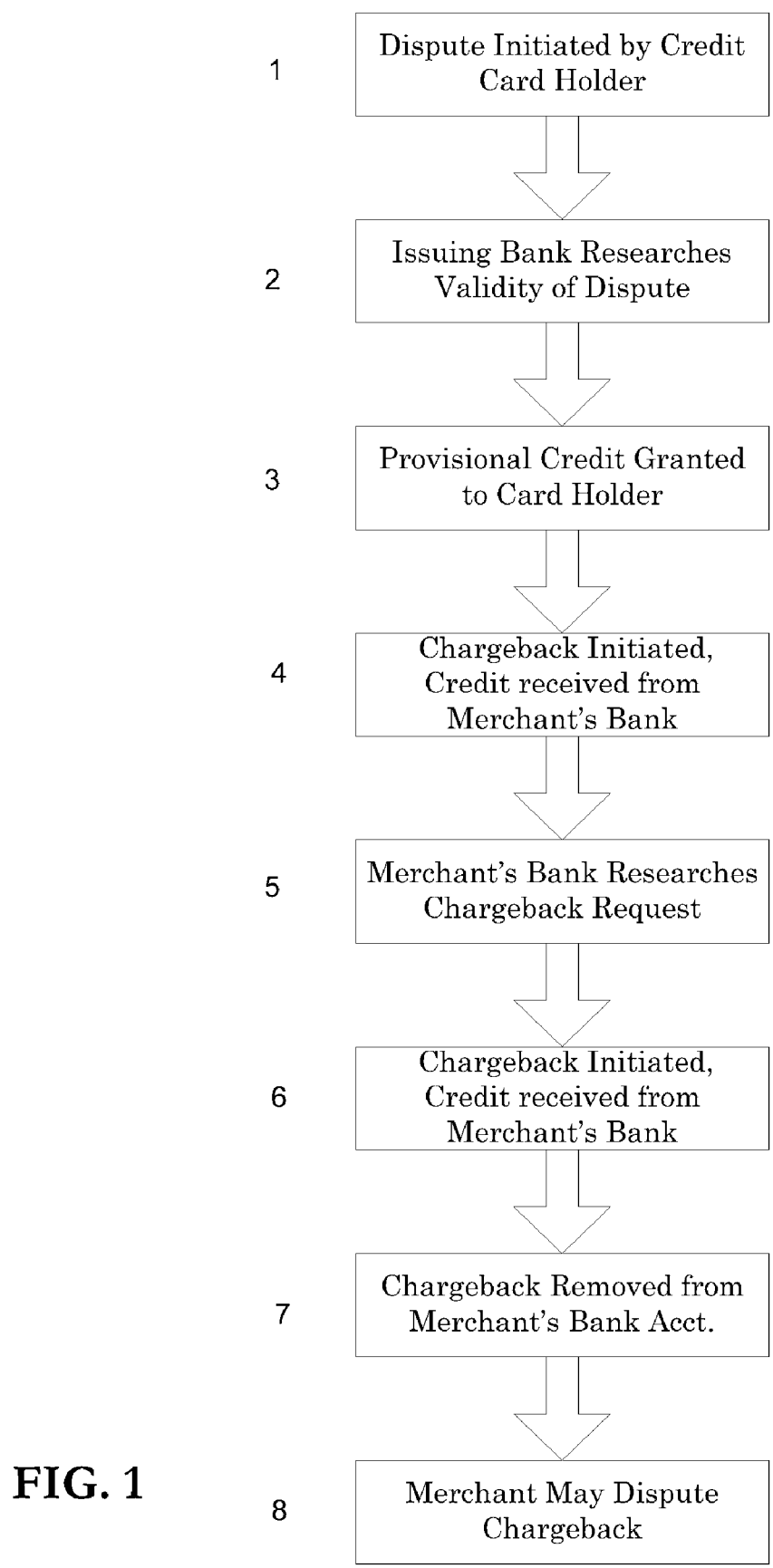
FIG. 1 is a simplified diagram illustrating the chargeback process.

Reference is now made to the figures in which like reference numerals refer to like elements.

In the following description, certain specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

Figure 2:
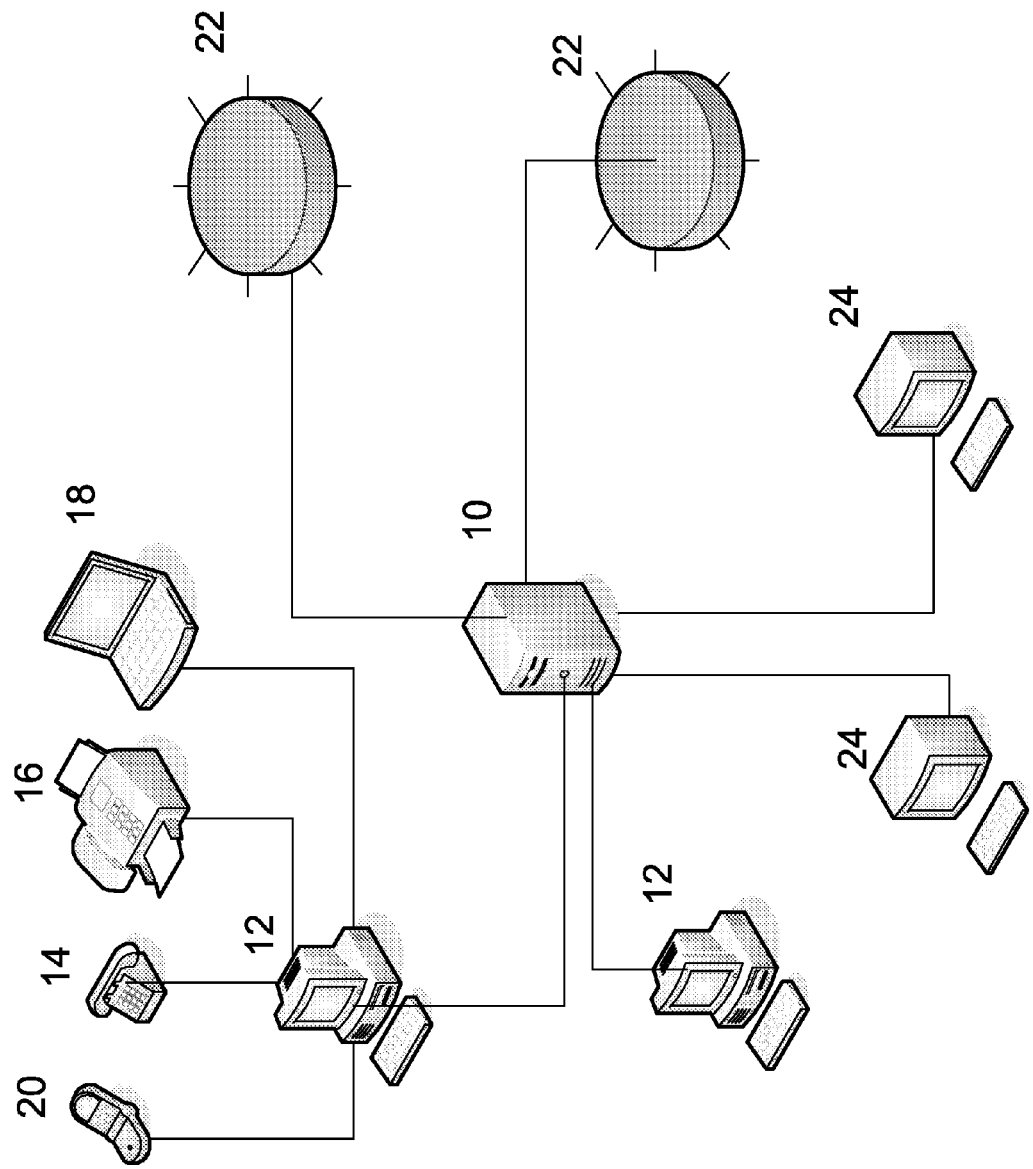
FIG. 2 is a simplified diagram illustrating the system components of a preferred embodiment of the present invention.
Figure 3:
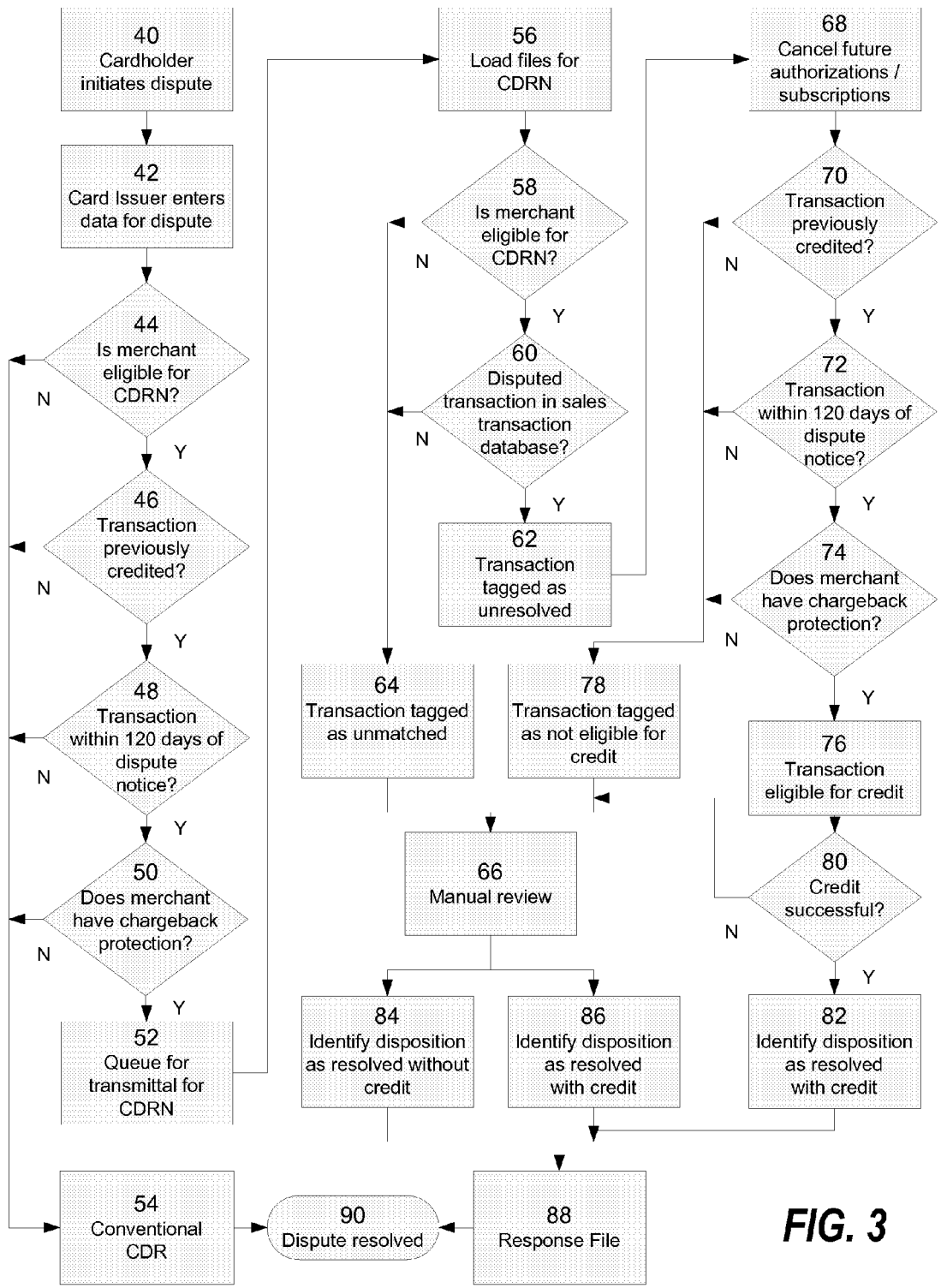
FIG. 3 is a flow diagram which illustrates certain methodologies in accordance with the present invention.

In one preferred embodiment, shown in FIGS. 2 and 3, the system and method of the present invention are illustrated.

As shown in FIG. 2, the system of the present invention preferably includes a dispute resolution server 10, which is linked to a card issuer's computer processing system 12 by an application programming interface on the card issuer's computer system. The interface obtains transaction details necessary to implement the dispute resolution process, including credit card number, credit card expiration date, cardholder name and address, transaction amount and merchant identification, such as merchant name, phone number, URL, or merchant acquirer bank identification.

The interface is connected to the dispute resolution server 10 by a data transmission link, such as the Internet, or other electronic file transfer protocols such as FTP, SFTP, FTPS, HTTP, HTTPS, TELNET, SSH, XML, REST, or JSON as examples.

The interface preferably is connected to the dispute resolution server 10 by data transmission link, such as the Internet, telephone line or network cable. The interface may transfer transaction data to the server in batch files or by single transaction record using electronic file transfer protocols such as FTP, SFTP, FTPS, HTTP, HTTPS, TELNET, SSH, XML, REST, or JSON as examples. Either "nighttime" batch file transfer or real time transfer by API may be used for these files.

Alternatively, the system of the present invention may be operated on the card issuer's computer 12 which is connected via the Internet or other communication network to the dispute resolution program server 10.

As shown in FIG. 2, the cardholder initiating the dispute may submit the relevant information to the card issuer by telephone 14, fax 16, or bye-mail, SMS, online or other electronic medium using a computer 18 or mobile device 20, such as cellular telephone, standard landline, PDA, or pager. The cardholder may alternatively submit the dispute information by The cardholder is equipped with a processing device 12, such as a PC or laptop, which is programmed to receive and process data related to disputed transactions. The dispute data may be input into appropriate electronic format manually by the card issuer's employee using an input device, such as a keyboard or mouse, or it may be converted directly from the cardholder's input by IVR in the case of a telephone notice, by OCR in the case of a mail or fax notice, or directly from electronic input in the case of on-line submissions.

The card issuer processing device 12 preferably transmits a batch file containing one or more dispute items to the dispute resolution system server 10 via one of the previously described data transmission links and electronic file transfer protocols. The dispute resolution system will process the file and return a response back to the card issuer processing device 12 via the same link and format to confirm receipt of the file.

The dispute resolution system will also generate a response concerning the disputed transaction to the originating merchant's processing device 24 via previously described data transmission links and electronic file transfer protocols. The dispute resolution system server 10 also serves as the payment processing system for the merchant. Thus, in the capacity of payment processing system for the merchant, the dispute resolution system server 10 receives transactions from the merchant, forwards received transactions to acquirers 22, and stores transaction data. As is known in the art, acquirer 22 is a merchant's acquiring bank which is a banking or financial institution which provides the merchant with a merchant processing account for the processing of electronic transactions originating from the merchant's customers. The acquirer 22 sends transaction information to the payment networks, such as Visa, MC, Amex, Discover and JCB which connect the Issuer and the Acquirer, and provide a clearing and settlement service to transfer payment information between the Issuer and the Acquirer. Because the dispute resolution system server 10 also serves as the payment processing system for the merchant, the present invention offers the advantage of immediately declining future transactions from the merchant for the disputing consumer, including terminating ongoing recurring transactions. This prevents the recurrence of such disputed transactions while the dispute relating to the current disputed transaction is resolved.

As shown in FIG. 3, the process begins at step 40 with the cardholder initiating the dispute by providing notice of the dispute to the card issuer. The cardholder may submit the dispute to the issuer by telephone, mail, fax, e-mail or online. On-line submissions may be facilitated by the card issuer in the provision of a link in an on-line statement provided to the cardholder of a pop-up-form. This link may connect the cardholder to the card issuer's processing system, or alternatively directly to the merchant with whom the transaction was initiated. This latter alternative allows the cardholder to mediate the dispute directly with the merchant.

Once the chargeback dispute template is completed by the cardholder, they can select the submit button and the system will use the template to generate a standard charge dispute form, which includes all the necessary information to dispute a charge.

This information may be submitted by the cardholder with the following statement:

I have examined the charges made to my account and I am disputing an item for the following reason:

1. Neither I nor any person authorized by me to use my card made the charge listed above. In addition, neither I nor anyone authorized by me received the goods and services represented by this transaction. (If you do not recognize a sale, choose this option and call Customer Service immediately.)
2. Although I did participate in a transaction with the merchant. I was billed for transaction(s) totaling $ that I did not engage in, nor did anyone else authorized to use my card. I do have all of my cards in my possession. Enclosed is a copy of the authorized sales slip.
3. I have not received the merchandise that was to have been shipped to me. Expected date of delivery was (mm-dd-yy). I contacted the merchant on (mm-dd-yy), and the merchant's response was: (In order to assist you, the merchant must be contacted.)

Of course, as is recognized in the art, there may exist many other bases for an asserted dispute, as exemplified in the listing of Dispute Reason Codes discussed later.

At step 42, the card issuer inputs the data relating to the notice of dispute received from the card issuer. The dispute data includes such information regarding the transaction, such as:

Name:
Date: (mm-dd-yy)
Account #: - - -
Amount of Dispute: $
Reference #:
Merchant:
Reason for dispute:

At step 44, upon receipt of the dispute notification, the Issuer processor 10 determines whether the dispute is eligible for processing by the Dispute Resolution System by matching the disputed transaction details extracted by the Issuer from interchange data against a table of identifiers for participating merchants provided by the Dispute Resolution System. The table may be periodically updated by a data transmission, preferably by secure batch file transmission such as FTPS (FTP over SSL), although other types of file transmission may be used, such as e-mail of Excel spreadsheet files or physical transfer of electronic storage media, including DVD or CD/ROM.

Preferably, at steps 46, 48 and 50, the card issuer system also screens disputes for ineligible transactions based on the predetermined transaction-level eligibility requirements such as whether the transaction was previously refunded or refunded by the merchant and/or the dispute resolution system provider at step 46, whether the transaction has a Central Processing Date (CPO) greater than a predetermined interval, such as 120 days from the date of the dispute resolution system dispute request, at step 48, and whether the transaction originated with a merchant who receives chargeback protection, as chargeback rights do not exist for the card Issuer against the merchant in such case in step 50. As may be appreciated by one skilled in the art, the eligibility criteria which are tested at steps 46, 48 and 50 may vary for different card issuers, depending upon their specific preferences. For example, eligibility criteria may also be determined according to the identity of the originating merchant, depending upon the Card Issuer's preference. Further, whether the transaction has a Central Processing Date (CPO) greater than a predetermined maximum interval, such as 120 days from the date of the dispute resolution system dispute request, may also be used to determine eligibility. As may be understood by persons of ordinary skill in the art, the 120 day maximum interval from the date of the transaction to the date of the dispute resolution system dispute request is offered only as an example, and this interval may be adjusted as desired by the Card Issuer.

At step 52 disputes which return a match when referencing the merchant eligibility table, and which do not violate the transaction-level criteria are flagged as Dispute Resolution System eligible and sorted into a separate queue within the Issuer's system prior to processing by the Dispute Resolution System. The Dispute Resolution System request file is generated and supplied by the Issuer as specified below and transmitted via internet for Dispute Resolution System processing.

| Field Name | Description |
| --- | --- |
| Issuer ID | Predefined Issuer identification value provided by system to identify the Issuer submitting the dispute request file |
| Transaction Description | Merchant DBA/payment billing descriptor |
| Billing Descriptor Phone | Billing descriptor merchant phone number parsed from Transaction Description or City Name field |
| Acquiring Institution Identification Code | |
| Card Acceptor Identification Code | |
| Card Acceptor Terminal Identification | |
| Card Acceptor Name/Location - Merchant Name | |
| Card Acceptor Name/Location - City Name | |
| Card Acceptor Name/Location - Country Code | |
| Merchant Type/MCC | |
| POS Entry Mode | |
| POS Condition Mode | |

-continued

| Field Name | Description |
| --- | --- |
| First Name | Cardholder first name |
| Last Name | Cardholder last name |
| Billing Street Address 1 | Cardholder billing street address 1 |
| Billing Street Address 2 | Cardholder billing street address 2 |
| Billing City | Cardholder billing city |
| Billing State | Cardholder billing state |
| Billing Zip | Cardholder billing zip |
| Payment Type | "visa", "mastercard", "amex", "discover", "jcb", or "diners" |
| Account Number | Full or Hashed CC Number. If hashed, minimum first 6, last 4 digits; example 412345xxxxxx1234 |
| Expiration Date | Cardholder expiration date formatted as "MMYY" |
| Authorization Code | Authorization code from original transaction |
| Central Processing Date (CPD) | Original sale transaction date formatted as "MM/DD/YYYY" |
| Transaction Amount | Original sale transaction ticket amount |
| ARN | 23 digit acquirer's reference number |
| Transaction Type | Transaction Type Identifier (reference Transaction Type matrix) |
| Dispute Date | Date cardholder contacted issuing bank formatted as "MM/DD/YYYY" |
| Dispute Amount | Amount of inquiry or chargeback (in the event of a partial dispute, this amount may potentially be less than the transaction amount of this file) |
| Reason Code | Reason code of the dispute classification (reference Dispute Reason Code table) |
| Case Number | Unique case identifier generated by the Issuer E.g.: "20080710-1" |

The following chart of Data Type Codes apply to the above table.

| Code | Name | Description |
| --- | --- | --- |
| A | Alpha | Only alpha data is allowed. |
| N | Numeric | Only numeric data is allowed. |
| AN | Alpha-Numeric | Alpha and Numeric data is allowed. |

The request file contains a Dispute Reason Code which specifies the basis for the transaction dispute. The following exemplar predefined Dispute Reason Codes have been recognized by two major card networks:

| Visa Code | MC Code | Description |
| --- | --- | --- |
| | | Cardholder Asserted Disputes |
| 30 | 55 | Services Not Provided or Merchandise Not Received |
| 85 | 60 | Credit Not Processed |
| 41 | 41 | Cancelled Recurring Transaction |
| 53 | 53 | Not As Described or Defective Merchandise |
| 75 | 63 | Cardholder Does Not Recognize Transaction |
| 82 | 34 | Duplicate Processing |
| 86 | 59 | Paid By Other Means |
| N/A | 54 | Cardholder Dispute - Not Elsewhere Classified |
| 57 | N/A | Fraudulent Multiple Transactions |
| 83 | 37 | Fraudulent Transaction - Card Absent Environment |
| | | Non-Cardholder Asserted Disputes |
| 80 | 31 | Incorrect Transaction Amount or Account Number |
| 76 | 50 | Incorrect Currency or Transaction Code or Domestic Processing Violation |
| 77 | 12 | Non-Matching Account Number |
| 79 | N/A | Requested Transaction Information Not Received |
| 60 | 02 | Requested Copy Illegible or Invalid |
| 71 | N/A | Declined Authorization |
| 72 | N/A | No Authorization |
| 73 | 35 | Expired Card |
| 74 | 42 | Late Presentment |

-continued

| Visa Code | MC Code | Description |
| --- | --- | --- |
| 76 | 46 | Incorrect Currency or Transaction Code or Domestic Processing Violation |
| N/A | 01 | Non-Receipt of Requested Item |
| N/A | 08 | Requested/required Authorization Not Obtained |
| N/A | 57 | Credit Card Activated Telephone Transaction |
| 00 | 00 | Other/Unspecified (Default if no reason code is passed) |

Alternatively, at step 54, those disputes which return "no match" with the qualifying merchant identification descriptors in the table or which violate the transaction-level criteria are flagged to be processed via the Issuer's conventional dispute resolution procedures.

Once a predetermined number of eligible dispute records, or on a predetermined interval, the card issuer system transmits a batch file containing one or more dispute items to a file transfer system, such as FTPS. At step 56, the dispute resolution system will then pick up the file, remove the file from the FTPS system and load the file into the dispute resolution system. In the subsequent steps, the dispute resolution system will process the file and return a response back to a location on the FTPS system.

At step 58, the dispute resolution system processor 10 confirms whether the dispute is eligible for processing by the Dispute Resolution System transactions by matching the merchant identification descriptor from the disputed transaction against the table of identifiers for participating merchants.

At step 60, the dispute resolution system processor 10 determines whether the transaction is eligible for the dispute resolution system processing. This eligibility is determined by attempting to match the dispute request transaction details against the records in the sales transaction database. This sales transaction database represents transactions initiated with the participating merchants, so that, if appropriate, a refund may be issued to the cardholder from the merchant. As illustrated at step 60 in FIG. 3, the sales transaction database may be populated with data relating to transactions from participating merchants, which transactions were originally processed through the dispute resolution system processor 10. Thus, only those transactions which were processed through the dispute resolution system processor 10 transaction gateway are eligible for the dispute resolution system processing and are selected in step 60. Optionally, the sales transaction database can be populated with bulk file transfers of data representing transactions initiated with the participating merchants. This data may be provided by the merchants themselves, or from acquirers, card associations, or other entities. Thus, by attempting to match the dispute request transaction details against the eligible sales transaction database, eligibility for dispute resolution system processing can be determined so that only those transactions for which there is the ability to issue a refund to the cardholder from the merchant are processed in the Dispute Resolution System.

At step 62 dispute requests for transactions which return a match when referencing the merchant eligibility table, and which match against the records in the sales transaction database as originally processed through the dispute resolution system, are tagged as "Unresolved" and queued for further processing by the Dispute Resolution System. The dispute requests are identified according to the following table:

Issuer Response Codes

| Code | Description |
|---|---|
| | Approval for Credit |
| 100 | Resolved w/ Credit: Cancellation & credit processed |
| 101 | Resolved w/ Partial Credit: Cancellation & partial credit processed |
| | Unmatched Request |
| 900 | Unmatched - General |
| 901 | Unmatched - Invalid Merchant, Non-dispute resolution participating Merchant |
| 902 | Unmatched - Original sale transaction not processed via service provider; Unable to honor request |
| | Credit Decline |
| | Ineligible Dispute Resolution Credit Request, Recurring Payment Authorization Cancellation Only |
| 940 | Decline - Duplicate dispute resolution credit request |
| 950 | Decline - General |
| 951 | Decline - Transaction previously credited, credit transaction details provided |
| 952 | Decline - Transaction previously charged back, chargeback details provided |
| 953 | Decline - Request is greater than 120 days from CPD of transaction |
| 954 | Decline - Successfully authenticated transaction (Verified by Visa/SecureCode) |

One of the bases for declining the credit request identified in the table is that the transaction has a Central Processing Date (CPO) greater than 120 days from the date of the dispute resolution system dispute request. As described above, the 120 day maximum interval from the transaction to the date of the dispute resolution system dispute request is only offered as an example, and this interval may be adjusted as desired by the Card Issuer.

Alternatively, at step 64, those disputes which return "no match" with the qualifying merchant identification descriptors in the table or which were not originally processed through the dispute resolution system are tagged as "unmatched" and at step 66 are forwarded for manual review to determine the reason for the failed credit transaction (invalid account number, account closed, previously charged back, etc.).

At step 68, the card accounts that are subject to the credit determination are flagged for cancellation of future authorizations and subscriptions so that future authorizations from the merchant for the disputing cardholder are blocked at the gateway level and the cardholder's subscription is cancelled. This prevents further use of the card for goods or services provided by the selling merchant until the dispute has been satisfactorily resolved.

At steps 70, 72 and 74, the card issuer System confirms that the transaction is eligible for dispute resolution system based on the predetermined transaction-level eligibility requirements such as whether the transaction was previously refunded or refunded by the merchant and/or the dispute resolution system provider at step 70, whether the transaction has a Central Processing Date (CPO) greater than 120 days from the date of the dispute resolution system dispute request at step 72, and whether the transaction originated with a merchant who receives chargeback protection, as chargeback rights do not exist for the card Issuer against the merchant in such case in step 74.

At step 76, eligible credit transactions are processed through credit card payment gateways 22 such that if the dispute is determined to be valid, the original sales transaction is rescinded and the cardholder's account is credited in the amount of the disputed purchase.

Alternatively, at step 78, those disputes which are determined to be ineligible for dispute resolution system based on the predetermined transaction-level eligibility requirements are flagged to undergo a manual review at step 66, to determine the reason for the failure to meet eligibility requirements (such invalid account number, account closed, previously charged back, etc.).

At step 80, a determination as to whether the original sales transaction is credited by a response from the interchange system that the credit was processed, and at step 82, successful credit disputes result in the Dispute Resolution System request status being updated to "Resolved w/Credit."

At step 78, unsuccessful credit disputes are identified to undergo a manual review at step 66, to determine the reason for the failed credit transaction (invalid account number, account closed, previously charged back, etc.).

At step 84, the Dispute Resolution System record status for the transaction is updated to "Resolved w/Out Credit" and the description for the credit request failure is included in response file.

Alternatively, at step 86, for successful credit transactions, the status in the Dispute Resolution System record is updated to "Resolved with Credit."

At step 88, for both the successful credit transactions and unsuccessful credits transactions, the response file containing updated information for all Dispute Resolution System request records is compiled and transmitted to the card issuer and the merchant with the appropriate disposition for each transaction—"Resolved w/credit", "Resolved w/o credit," "Unmatched," etc. The response file may be made available to the card issuer and the merchant by an on-demand web portal for downloading at the convenience of the card issuer and the merchant.

The Dispute Resolution System response file is transmitted to the Issuer as specified below upon processing the transaction level matching against the Dispute Resolution System request file.

| Field Name | Description |
|---|---|
| Case Number | Returned from request |
| ARN | Returned from request |
| Billing Descriptor | Merchant billing descriptor that credit posted as |
| Billing Descriptor Phone Number | Billing descriptor merchant phone number that credit posted as |
| Date | Date of action |
| Amount | Amount of action |
| Transaction | Transaction Type Identifier: Always set as "Dispute Resolution System" |
| Response | Please reference Dispute Resolution System Issuer response matrix |
| Description | Dispute Resolution System response description from the Dispute Resolution System Issuer Response Matrix |

The Response code in the above table of the Dispute Resolution System Issuer Response File corresponds to the values in the following table.

| Code | Description |
|---|---|
| | Approval |
| 100 | Resolved w/ Credit: Cancellation & credit processed |
| 101 | Resolved w/ Partial Credit: Cancellation & partial credit processed |
| | Unmatched Request |
| 900 | Unmatched - General |
| 901 | Unmatched - Invalid Merchant, Non-dispute resolution participating Merchant |
| 902 | Unmatched - Original sale transaction not processed via service provider; Unable to honor request |
| | Decline |
| 940 | Decline - Duplicate dispute resolution credit request |
| 950 | Decline - General |
| 951 | Decline - Transaction previously credited, credit transaction details provided |
| 952 | Decline - Transaction previously charged back, chargeback details provided |
| 953 | Decline - Request is greater than 120 days from CPD of transaction |
| 954 | Decline - Successfully authenticated transaction (Verified by Visa/SecureCode) |

Also, at step 88, a merchant response file, including a cancellation record created to remove the disputing customer from recurring payment program, is routed to the merchant. The Cancellation Export Batch File is provided as indicated below.

| Field Name | Description |
|---|---|
| Transaction Date | Timestamp of Transaction Format: YYYYMMDDHHMMSS |
| Transaction ID | System Transaction ID |
| Original Transaction ID | System Transaction ID referencing the original transaction. |
| Payment Type | Payment Identifier<br>Visa<br>MasterCard<br>American Express<br>Discover |
| Transaction Type | Transaction Type Identifier Cancellations |
| Transaction Status | Status of Transaction |
| Account Number | Account Number |
| Expiration Date | Expiration Date<br>MMYY Format |
| Amount | USD Total Transaction Amount of the Cancellation Activity<br>NNN.NN Format |
| Order Id | Order Number |
| Response | 1 = Transaction Accepted<br>2 = Transaction Declined<br>3 = Error in transaction data or system error |
| Response Text | Possible values:<br>CDRN<br>CDRN_WITH_REFUND<br>CDRN_WITH_PARTIAL_REFUND<br>MERCHANT<br>RETRIEVAL<br>RETRIEVAL_WITH_REFUND |
| AVS Response | AVS Response Code |
| CVV Response | CVV Response Code |
| Authorization Code | Transaction authorization code |
| RESERVED | RESERVED |
| Merchant Name | Merchant Name |
| Merchant Account Name | Merchant Account Name |
| Order Description | Order Description |
| PO Number | Purchase Order Number |
| Shipping Amount | USD Shipping Amount<br>NNN.NN Format |
| Tax Amount | USD Tax Amount<br>NNN.NN Format |
| Billing First Name | Cardholder Billing First Name |
| Billing Last Name | Cardholder Billing Last Name |
| Billing Company | Cardholder Billing Company |
| Billing Email | Cardholder Email Address |
| Billing Phone | Cardholder Phone Number |
| Billing Fax | Cardholder Fax Number |
| Billing Website URL | Cardholder Company Website |
| Billing Address 1 | Cardholder Billing Address 1 |
| Billing Address 2 | Cardholder Billing Address 2 |
| Billing City | Cardholder Billing City |
| Billing State | Cardholder Billing State |
| Billing Postal Code | Cardholder Billing Postal Code |
| Billing Country Code | ISO-3166 Country Code<br>United States = "US" |
| Shipping First Name | Shipping First Name |
| Shipping Last Name | Shipping Last Name |
| Shipping Company | Shipping Company Name |
| Shipping Email | Shipping Email Address |
| Shipping Address 1 | Shipping Address 1 |
| Shipping Address 2 | Shipping Address 2 |
| Shipping City | Shipping City |
| Shipping State | Shipping State |
| Shipping Postal Code | Shipping Postal Code |
| Shipping Country Code | ISO-3166 Country Code<br>United States = "US" |
| IP Address | Transaction Authorization Code |
| Merchant Account ID | Reserved for Future Use |
| Authentication Value | Checking Account Name |
| CAVV | Check Routing Number |
| XID | Check Account Number |
| Shipping Carrier | Shipping Carrier - "Other", "FedEx", UPS, "USPS" |
| Tracking Number | Shipping Tracking Number |
| Shipping Date | Shipping Date |
| Cell Phone Number | Consumer Cell Phone Number |
| Billing Descriptor Name | Soft Billing Descriptor Name. Only supported by certain payment processors. |
| Billing Descriptor Phone Number | Soft Billing Descriptor Phone Number. Only supported by certain payment processors. |
| Merchant Defined Fields | Merchant Defined Data |
| Original Transaction Date | Timestamp of Referenced Transaction Format: YYYYMMDDHHMMSSS |

At step 90 the dispute is confirmed to have been resolved and an acknowledgement of receipt of files by the card issuer may be transmitted to the dispute resolution system to confirm the resolution by the card issuer.

Thus, the present invention provides a system for resolving disputes between a customer and an electronic payment provider concerning an electronic transaction between the customer and a merchant, including a computer programmed to receive data related to the transaction and to transmit the data to a dispute resolution server, and a dispute resolution server programmed to compare the transaction data to predetermined eligibility criteria for dispute resolution, and if the dispute resolution criteria is met, to decline future transactions from the merchant for the disputing consumer, the server further programmed to compare the transaction data to predetermined eligibility criteria for transaction credit, and if the credit criteria is met, transmitting a credit instruction for the transaction.

The present invention also provides a computer-based method for resolving disputes between a customer and an electronic payment provider concerning an electronic transaction between the customer and a merchant, including receiving data related to the transaction in a computer; transmitting the data from the computer to a dispute resolution server; comparing the transaction data to predetermined eligibility criteria for dispute resolution in the dispute resolution server, and if the dispute resolution criteria is met, declining future transactions from the merchant for the disputing consumer; and, comparing the transaction data to predetermined eligibility criteria for transaction credit, and if the credit criteria is met, and transmitting a credit instruction for the transaction.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A system for resolving disputes concerning an electronic payment transaction between a customer and a merchant, comprising:
   a dispute resolution server programmed to:
      receive data related to the transaction; compare the transaction data to predetermined eligibility criteria for dispute resolution; and
      in response to the dispute resolution criteria being met, decline future transactions from the merchant for the customer.

2. The system of claim 1, wherein the dispute resolution server is further programmed to:
   compare the transaction data to predetermined eligibility criteria for transaction credit; and
   in response to the credit criteria being met transmit a credit instruction for the transaction.

3. The system of claim 2, further comprising a computer programmed to compare the transaction data to the dispute resolution criteria, and in response to the dispute resolution criteria being met, transmit the transaction data to the dispute resolution server.

4. The system of claim 3, wherein the electronic payment transaction is accomplished using an electronic payment provider, and the electronic payment provider inputs the transaction data into the computer.

5. The system of claim 4, wherein the transaction data is input into the computer by at least one of: manual input by an operator, voice recognition software, user input via a touch-tone phone, user input via Internet connection, optical character recognition (OCR), email, SMS message, fax, mail, and in-person communication.

6. The system of claim 5, wherein the transaction data is transmitted to the electronic payment provider by at least one of: Internet, telephone line, and network cable.

7. The system of claim 6, wherein the transaction data is transmitted by an application programming interface (API) that implements at least one of batch file transfer or real time transfer.

8. The system of claim 6, wherein the transaction data is transmitted via at least one of batch files or a single transaction record using an electronic file transfer protocol.

9. The system of claim 8, wherein the electronic file transfer protocol comprises at least one of FTP, SFTP, FTPS, HTTP, HTTPS, TELNET, SSH, XML, REST, and JSON.

10. A computer-based method for resolving disputes concerning an electronic transaction between a customer and a merchant, comprising the steps of:
    receiving, at a dispute resolution server, data related to the transaction;
    comparing, via a processor of the server, the transaction data to predetermined eligibility criteria for dispute resolution; and
    in response to the dispute resolution criteria being met, declining, via the processor, future transactions from the merchant for the customer.

11. The method of claim 10, further comprising:
    comparing the transaction data to predetermined eligibility criteria for transaction credit; and
    in response to the credit criteria being met, transmitting a credit instruction for the transaction.

12. The method of claim 11, further comprising comparing the transaction data to the dispute resolution criteria, and in response to the dispute resolution criteria being met, transmitting the transaction data to a dispute resolution server.

13. The method of claim 11, wherein the step of receiving comprises obtaining the transaction data as information inputted into a computer by an electronic payment provider.

14. The method of claim 13, wherein the transaction data is input into the computer by at least one of: manual input by an operator, voice recognition software, user input via a touch-tone phone, user input via Internet connection, optical character recognition (OCR), email, SMS message, fax, mail, and in-person communication.

15. The method of claim 11, wherein the transaction data is transmitted to an electronic payment provider by at least one of: Internet, telephone line, and network cable.

16. The method of claim 15, wherein the transaction data is transmitted by an application programming interface (API) that implements at least one of batch file transfer or real time transfer.

17. The method of claim 15, wherein the transaction data is transmitted via at least one of batch files or a single transaction record using an electronic file transfer protocol.

18. The method of claim 17, wherein the electronic file transfer protocol comprises at least one of FTP, SFTP, FTPS, HTTP, HTTPS, TELNET, SSH, XML, REST, and JSON.

* * * * *